United States Patent
Denby (10) Patent No.: US 6,578,408 B1
(45) Date of Patent: Jun. 17, 2003

(54) TESTING FLUID-CONTAINING SYSTEMS

(76) Inventor: Carl Denby, North Yorkshire (GB)

( * ) Notice: Subject to any disclaimer, the term of this patent is extended or adjusted under 35 U.S.C. 154(b) by 0 days.

(21) Appl. No.: 09/381,260

(22) PCT Filed: Mar. 20, 1998

(86) PCT No.: PCT/GB98/00847

§ 371 (c)(1),
(2), (4) Date: Nov. 22, 1999

(87) PCT Pub. No.: WO98/43059

PCT Pub. Date: Oct. 1, 1998

(30) Foreign Application Priority Data

Mar. 20, 1997 (GB) .............................. 9705748

(51) Int. Cl.$^7$ .............................................. G01M 3/08
(52) U.S. Cl. ............................. 73/46; 73/40; 73/40.5 R
(58) Field of Search ................... 73/40, 40.5 R, 73/46

(56) References Cited

U.S. PATENT DOCUMENTS

| | | | | |
|---|---|---|---|---|
| 277,756 | A | * 5/1883 | Lunkenheimer | 73/46 |
| 3,529,463 | A | * 9/1970 | Orlando et al. | 73/49.2 |
| 3,583,842 | A | 6/1971 | Hancock et al. | 431/16 |
| 4,131,214 | A | 12/1978 | Rogers | 222/1 |
| 4,161,957 | A | 7/1979 | Schoellkopf | 137/205 |
| 4,374,478 | A | * 2/1983 | Secord et al. | 73/863.31 |
| 4,387,591 | A | * 6/1983 | Corzine et al. | 73/168 |
| 4,523,452 | A | * 6/1985 | Brayman | 73/40 |
| 4,714,233 | A | * 12/1987 | Oates | 251/14 |
| 4,777,828 | A | * 10/1988 | Ferris | 73/744 |
| 4,791,805 | A | * 12/1988 | Gates | 73/40.7 |
| 4,821,769 | A | * 4/1989 | Mills et al. | 137/554 |
| 4,825,198 | A | 4/1989 | Rolker et al. | 340/605 |
| 5,046,354 | A | * 9/1991 | Mungia et al. | 73/49.2 |
| 5,325,706 | A | * 7/1994 | Grose | 73/40.5 |
| 5,386,845 | A | * 2/1995 | Zink | 137/350 |
| 5,400,646 | A | 3/1995 | Kraus et al. | 73/49.2 |
| 5,439,355 | A | * 8/1995 | Jimison et al. | 417/63 |
| 5,540,083 | A | * 7/1996 | Sato et al. | 73/40 |
| 5,668,308 | A | * 9/1997 | Denby | 73/49.2 |
| 5,715,786 | A | * 2/1998 | Seiberth | 123/198 D |
| 5,801,298 | A | * 9/1998 | Anderson | 73/49.8 |
| 6,112,578 | A | * 9/2000 | Black et al. | 73/40 |

FOREIGN PATENT DOCUMENTS

| | | | |
|---|---|---|---|
| GB | 1444249 | 8/1973 | G01M/3/32 |
| GB | 2265988 | 10/1993 | G01M/3/26 |
| GB | 2297623 | 8/1996 | G01M/3/37 |
| WO | WO 82/01590 | 5/1982 | G01M/3/26 |
| WO | WO 91/02232 | 2/1991 | G01M/3/26 |

* cited by examiner

Primary Examiner—Hezron Williams
Assistant Examiner—C D Garber
(74) Attorney, Agent, or Firm—Andrus, Sceales, Starke & Sawall, LLP (57) ABSTRACT

A testing procedure is disclosed for testing a road tanker, and other transportable storage tanks, for fluid-tightness. A positive test pressure is first applied to one storage compartment of the road tanker, and simultaneously a negative pressure is applied to the outlet pipe of the storage compartment, and a different negative pressure is applied to the vapour recovery manifold. The subsequent pressure variations within the storage compartment, the outlet pipe, the vapour recovery manifold and the adjacent storage compartments are then monitored in order to determine whether the interconnecting valves are leaking, and whether the various compartments under test are fluid-tight. In a second stage of the testing procedure, the pressure within the storage compartment is raised in order to test the pressure release level of a pressure release valve in the storage compartment, and the pressure within the storage compartment is then reduced in order to test the vacuum pressure release level of the pressure release valve. Similar testing procedures are applied to each of the storage compartments in turn.

10 Claims, 4 Drawing Sheets

TESTING FLUID-CONTAINING SYSTEMS

This invention relates to improvements in testing fluid-containing systems, in particular but not exclusively to the periodic, for example annual, testing of road tankers and transportable cargo tanks such as ISO tanks.

Road tankers generally haul a storage tank which includes a number of fluid storage compartments and a plurality of output pipes for delivering fluid from the storage compartments. In the case of a storage tank adapted for the transport of volatile liquids, such as fuels, the tank is also generally provided with a vapour recovery manifold for introducing recovered vapours to the storage compartments when the is fuel is being delivered.

It will be appreciated that, both for economical and environmental reasons, it is considered important that the compartments, including the storage compartments and the outlet pipes and/or the vapour recovery manifold, are ensured to be fluid-tight. Thus, legislation currently provides that a storage tank must be tested periodically to ensure its integrity.

The method currently used for testing such storage tanks is one in which each of the valves (in some cases as many 40 valves) associated with the storage tank compartment are to be removed and bench-tested for leakage and efficacy of operation, and refitted if found to be sound. In addition, the tank itself is periodically tested for leakage.

The current practice for performing the tests is based on a hydro-static principle, in which the valves are bench-tested using dedicated testing equipment, and in which the soundness of the tank is tested using water towers providing a head pressure height of approximately 3 meters of water in and above the storage compartments.

Various problems are associated with the current testing practice. The time taken to perform a full test is approximately 3 days. Precision is difficult to obtain in the testing method used. Large amounts of water are necessary to perform the tests. A full test will involve approximately 35,000 liters of water per road tanker, which, due to residues remaining in the tank at the time of testing, becomes contaminated during the test and must be decontaminated, which is costly.

In accordance with the present invention there is provided a method of testing a fluid-containing system comprising means for forming a plurality of compartments including a compartment A and a compartment B separated by valve means which are liable to leak, said method comprising:

fluidly sealing said compartment A with respect to said compartment B;

disposing said compartment A at a first gas pressure;

disposing said compartment B at a second gas pressure which is different to said first gas pressure; and monitoring pressure within said compartment A and/or said compartment B in order to determine whether said first separating means is subject to leakage.

Thus, it is possible to test the valve means separating the compartments A and B in the system in situ. In the prior art method, since the valves are bench-tested, it cannot in fact be guaranteed that the valves when in place on the tank are indeed fluid-tight. Furthermore, by using gas pressure, the wastages involved in hydro-static testing can be avoided.

The method preferably involves said system further comprising a compartment C separated from said compartment A by second means which are liable to leak, said method further comprising:

fluidly sealing said compartment A with respect to said compartment C;

disposing said compartment C at a third gas pressure, different to a gas pressure in said compartment A; and monitoring pressure within said compartment C and/or said compartment A in order to determine whether said second separating means is subject to leakage.

Thus, it is possible to test the first and second separating means contemporaneously, whilst maintaining a gas pressure within compartment A if appropriate. The separating means may be a valve, which is closed during the testing, or a wall common to the compartments under test.

Preferably, the first gas pressure is one of positive or negative in relation to atmospheric pressure, and the second and/or third gas pressures are the other of positive or negative in relation to atmospheric pressure. Accordingly, a pressure differential which is greater than either of the individual gas pressures with respect to atmosphere can be achieved. This is advantageous insofar as it is often unsafe to exceed individual gas pressures in compartments of a storage tank substantially above or below ±200 Mb, whereas a pressure difference of above that amount may be desired in testing a valve or wall.

Furthermore, by using a combination of positive and negative gas pressures, it is possible to discount monitored pressure variations which are due to variations in the ambient temperature or pressure. If on the one hand there is leakage between the compartments, the positive pressure will reduce and the negative pressure will tend towards atmospheric pressure. If on the other hand variations are attributable to ambient temperature or pressure changes, both pressures will generally tend towards, or away from, absolute vacuum.

The gas pressure used during a stage of testing in one of the compartments may be equal to atmospheric pressure, thus avoiding the need to pressurize or de-pressurize the compartments at that stage.

According to a further aspect of the invention there is provided a method of testing a fluid-containing system comprising means for forming a plurality of compartments, said method comprising setting up a set of pressure differences between said compartments in order to test first characteristics of said system, and subsequently changing at least one of said set of pressure differences between said compartments in order to test second characteristics of said system.

Thus, different characteristics of the tank may be tested by the sequential arrangement of different sets of pressure differences between compartments in the tank. A storage tank which includes a relatively large number of interconnected compartments can then be tested throughout. For example, the initial set of pressure differences may be such that the fluid-tightness of one or more of the compartments is initially testable, and the changed set of pressure differences may allow different of the compartments to be tested for fluid-tightness.

On the other hand, the first characteristics to be tested may include a fluid-tightness characteristic, and the second characteristics to be tested may include a pressure release characteristic of a pressure release valve in the same compartment, which is to be performed using a different pressure in the compartment.

According to a further aspect of the invention there is provided a method of testing a fluid-containing system comprising means for forming a plurality of compartments including a first compartment separated from a second compartment by first means, and a third compartment separated from said second compartment by a second means, said method comprising disposing said second compartment at a first gas pressure in order to test said first separating means at a desired pressure difference between said first and second compartments, and subsequently disposing said second compartment at a second gas pressure in order to test said second separating means at a desired pressure difference between said second and third compartments.

Thus, it is possible to test both the first and second separating means at desired pressure differences.

According to a yet further aspect of the invention there is provided a method of testing a pressure relief valve for a fluid storage compartment after a period of use, comprising increasing or reducing the pressure in said compartment by introducing or removing gas into or from said compartment, and monitoring said pressure until said pressure relief valve releases, noting the pressure inside said compartment at which said release occurs, and comparing said release pressure with an expected release pressure to determine whether said valve is functioning acceptably.

Thus, the pressure release characteristics of a pressure release valve may be tested in situ after a period of use of the storage compartment.

According to a still further aspect of the invention there is provided a storage compartment comprising one or more valve(s) which are operable during normal usage of said compartment, and further comprising means for defining an aperture for passing a pressurising fluid between said compartment and a pressure change means located outside said compartment, said aperture-defining means being provided solely for the purpose of allowing the testing of said compartment, including said one or more valve(s), by use of said pressure change means.

Thus, all of the valves which are operable during normal usage of the compartment may be fully tested in situ, whilst the aperture-defining means may be chosen whereby access is gained to the interior of the compartment to be of a type which is assured to be fluid-tight when closed.

In accordance with a related aspect there is provided a method of testing a storage compartment having a plurality of replaceable valves attached thereto which require testing for integrity, said method comprising testing all of said valves whilst attached to said compartment, by introducing and/or monitoring a pressure change in said compartment via an aperture defined by means which do not require testing for integrity.

In accordance with a further aspect there is provided a valve for attachment to a storage compartment, said valve comprising means for forming a spring-biassed seal with opposing means on said compartment, and means for defining an aperture for passing a pressurizing fluid between said compartment and a pressure change means located outside said compartment, said aperture-defining means allowing the testing of said seal, by use of said pressure change means, whilst said seal is formed.

Thus, although it will be possible to remove the valve in order to provide access to the interior of the storage compartment whereby pressurizing fluid may be passed between the compartment and a pressure change means, it would then not be guaranteed that, when the valve is replaced, the compartment remains fluid-tight. By use of this aspect of the invention, the valve whereby access is achieved to the interior of the compartment may be tested in situ and may thus be assured to be fluid-tight after testing.

According to a yet further aspect of the invention there is provided a kit for testing a storage compartment for fluid-tightness, said kit comprising a pressure sensor having a desired sensitivity and means for fluidly connecting said pressure sensor to said storage compartment, said connecting means comprising damping means for absorbing instantaneous fluctuations in pressure in said connecting means which exceed said desired sensitivity.

Thus, by providing a damping means for absorbing instantaneous fluctuations, for example as caused by instantaneous barometric fluctuations or temperature fluctuations in the connecting means, a stabilized read out of enhanced accuracy may be achieved. The damping means preferably comprises a coil of tubing which expands or contracts in response to the instantaneous fluctuations, thereby preventing the instantaneous fluctuations being transmitted in full to the pressure sensor.

Further aspects, features and advantages of the present invention will be apparent from the following description of a preferred embodiment of the invention, set out in relation to the accompanying drawings, wherein.

ROAD TANKER

Figure 1:
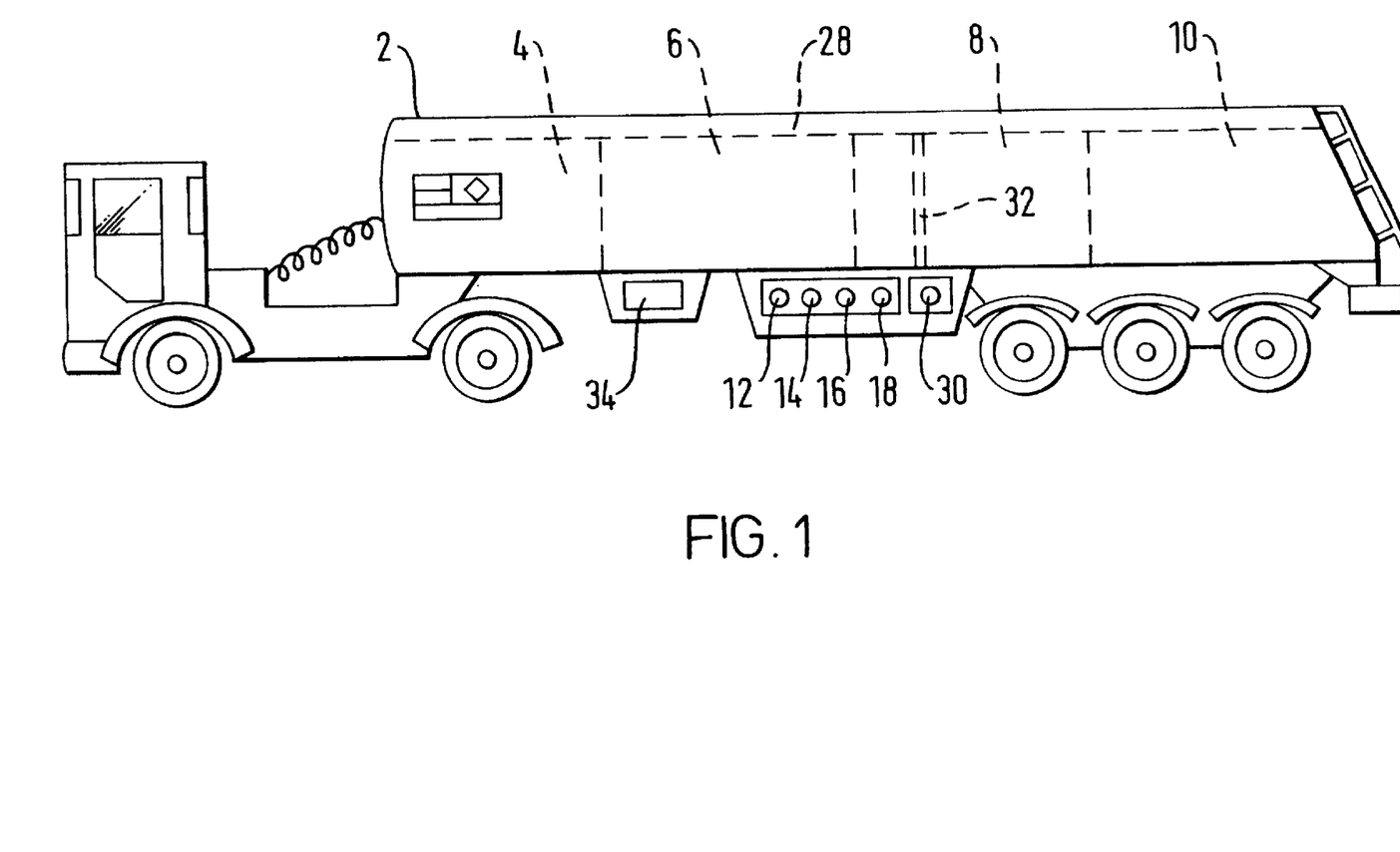
FIG. 1 shows a conventional road tanker.

FIG. 1 shows a conventional road tanker for transporting fluids, such as petrochemical liquids, in a storage tank 2. The tank includes a number of storage compartments 4, 6, 8, 10, connected to corresponding API interlock outlet points 12, 14, 16, 18 by further compartments in the form of outlet pipes 20, 22, 24, 26 (shown in FIG. 2). Also included is a compartment in the form of a vapour recovery manifold 28, connected to a vapour recovery inlet valve 30 by a connecting pipe 32. As shown, connecting pipe 32 runs through one of the storage compartments 32. The valving system on the road tanker is pneumatically controlled, via a control board 34 operated by delivery personnel. The road tanker can be used to transport up to four different types of liquid, such as gasoline or diesel fuels, or other petrochemicals, in its respective storage compartments, from central storage sites to distributed storage sites, such as filling stations. After a regulated period of use, for example annually, the storage tank of the road tanker is to be tested for fluid-tightness and the test should include a test of the fluid-tightness and efficacy of the valving system interconnecting the compartments 4, 6, 8, 10, 20, 22, 24, 26 and interfacing those compartments with the surrounding environment.

Figure 2:
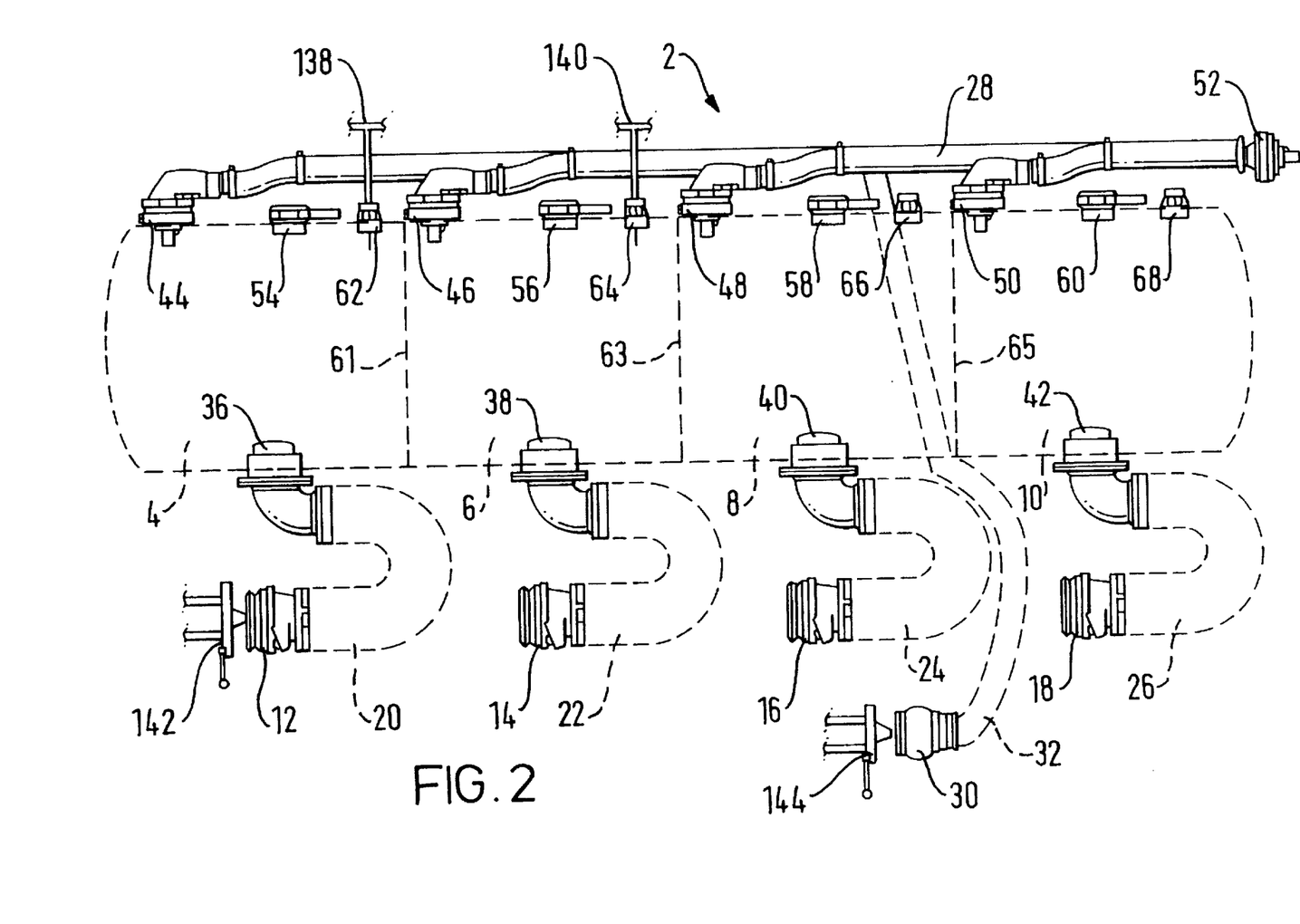
FIG. 2 is a schematic illustration of the road tanker of FIG. 1 under test in accordance with the present invention.

The valving system is illustrated in greater detail in FIG. 2. Foot valves 36, 38, 40, 42 are located at the base of each storage compartment, which should be capable of holding the weight of liquid contained when the compartment is full. The foot valves 36, 38, 40, 42 separate the storage compartments 4, 6, 8, 10 from the outlet pipes 20, 22, 24, 26. Each storage compartment has a sequential valve 44, 46, 48, 50, which separates the storage compartment from the vapour recovery manifold 28. When liquid is being delivered from a storage compartment, the vapour recovered from the delivery site is delivered to the compartment via the vapour recovery valve 30, the connecting tube 32 and the vapour recovery manifold 28. A vapour recovery vent valve 52, which releases vapours to atmosphere during periods of excess pressure in the vapour recovery manifold 28, is provided at one end of the vapour recovery manifold.

Each compartment is also provided with a pressure vacuum valve 54, 56, 58, 60 at the top of the compartment, which is a dual pressure relief valve. The pressure vacuum valve operates to release vapours from the compartment at a pre-set excess pressure (for example 70 Mb or 120 Mb, depending on the specified use of the compartment) and to introduce air into the compartment at a pre-set excess negative pressure (for example −20 Mb).

Each storage compartment is also provided with an interlock valve 62, 64, 66, 68, whereby an operator is able to manually balance the pressure within the tank with atmospheric pressure, and whereby a dip tube can be accessed to gauge the liquid level within the compartment.

As will be appreciated, the storage compartments 4, 6, 8, 10 are defined by the shell of the storage tank 2, their respective foot valves, sequential valves, pressure vacuum valves and interlock valves, and the baffle plates 61, 63, 65 which separate the storage compartments.

TEST KIT

Figure 3:
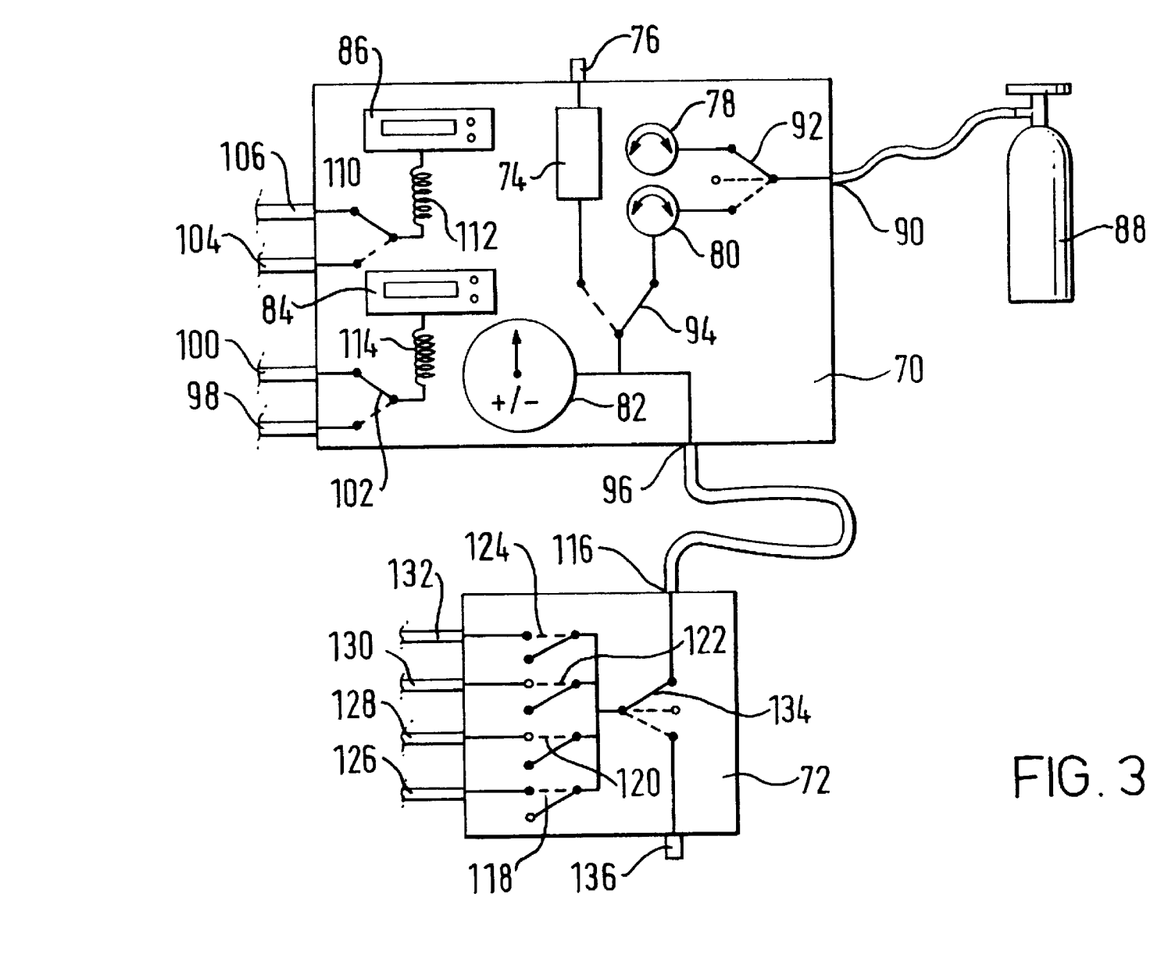
FIG. 3 is a schematic illustration of a testing kit for use in relation to the present invention.

FIG. 3 shows a test kit according to this embodiment of the invention, which includes a control case 70 and a remote valve block 72. The control case 70 houses a vacuum pump 74, connected to an exhaust outlet 76, a manually-operable vacuum regulator 78, a manually-operable pressure regulator 80, a mechanical positive/negative pressure gauge 82, and two electronic pressure transducers 84, 86. A canister 88 of oxygen-free nitrogen, or other suitable inert gas, is connected to an inlet port 90 of the control case. The inlet port 90 is connected to a manually-operable three position selector valve 92. In a first position, the selector valve 92 connects the inlet port 90, via the vacuum regulator 78, to the vacuum pump 74. In a second position, the selector blanks off the inlet port 90. In a third position, the selector valve 92 connects the inlet port 90 to the pressure regulator 80. A manually-operable two position selector valve 94 connects an outlet port 96 either to the vacuum pump 74 or the pressure regulator 80, depending on its position. The pressure gauge 82 is connected to the outlet port 96.

One of the pressure transducers 84 is connected to either a first pressure return port 98, or a second pressure return port 100 via a manually-operable two position selector valve 102, depending on its position. The other pressure transducer 86 is connected either to a third pressure return port 104 or a fourth pressure return port 106, via a further manually-operable two position selector valve 110, depending on its position.

The pressure transducers 84, 86 are electronic pressure transducers having a displayed read out accurate to 0.1 Mb, such as a Druck (trade mark) pressure transducer, Model No DPI 700 IS. A coil of neoprene tubing 112, 114, having a wall thickness of approximately 1.5 mm and an internal diameter of approximately 2 mm, connects each pressure transducer 84, 86 to its respective selector valve 102, 110. The purpose of this tubing coil is to provide a damping action in relation to the incoming pressure data, such that the coils absorb instantaneous transient fluctuations in pressure which would destabilize the reading on the pressure transducers 84, 86. The coils move, i.e. expand and contract, to provide the damping action. A similar effect could be achieved by using coils of other materials, such as copper, or by arranging for an amount of liquid to be present in the pressure return path close to the pressure transducers 84, 86, for example liquid mercury, which would damp such incoming pressure fluctuations.

The remote valve block 72 has an inlet port 116 which is connected to the outlet port 96 of the control case 70. Four manually-operable on/off selector valves 118, 120, 122, 124, connect pressure output ports 126, 128, 130, 132 to a manually-operable three position selector valve 134.

In a first position, the selector valve selects the input port 116. In a second position, the selector valve 134 blanks off the on/off selector valves 118, 120, 122, 124. In a third position, the selector valve 134 selects an exhaust port 136.

Referring again to FIG. 2, the test equipment includes two T-junction connectors 138, 140, a first API test cap 142, a second API test cap (not shown), a first vapor recovery test cap 144 and a second vapor recovery test cap (not shown). Each of the test caps has two fluid connections, one of which is connected to a respective pressure outlet port 126, 128, 130, 132 of the remote valve block 72, and the other of which is connected to a respective pressure return port 98, 100, 104, 106 of the control case 70.

The first API test cap 142 has a standard connection to the API valves 12, 14, 16, 18, and is also provided with a projecting cone on its inner surface which acts to open the respective API valve when the first API test cap 142 is connected to the valve, by pushing the valve inwards (thus overriding the pneumatic actuator). The second API test cap is essentially similar to the first API test cap 142, except that the coned projection is not present, and therefore when the second API test cap is attached to the respective API valve, the valve remains closed. The first vapour recovery test cap 144 is provided with a similar coned projection on its inner surface, for opening the vapour recovery valve 30 when connected thereto, and the second vapour recovery test cap is essentially similar except that the coned projection is not present, so that the vapour recovery valve 30 remains closed when the second vapour recovery test cap is attached thereto.

TESTABLE VALVES

In order to facilitate testing, the interlock valves 62, 64, 66, 68 are specially adapted to allow the T-junction connectors 138, 140 access to the interior of the storage compartments 4, 6, 8, 10, when connected thereto without requiring the interlock valves to be removed. The construction of these interlock valves 62, 64, 66, 68 is illustrated in FIGS. 4 and 5.

Figure 4:
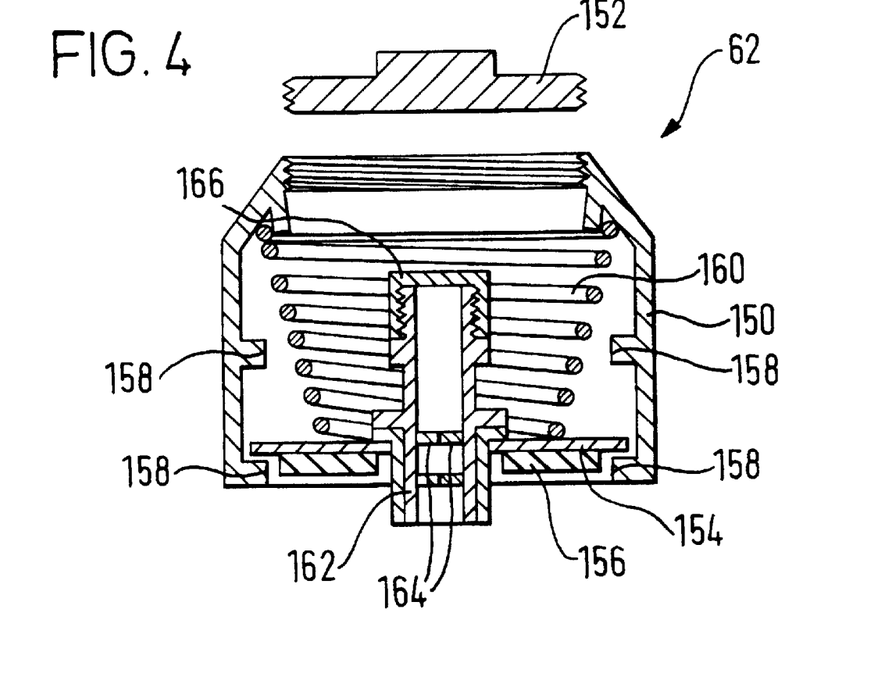
FIG. 4 is a cross-sectional illustration of a sealing valve in accordance with the present invention.
Figure 5:
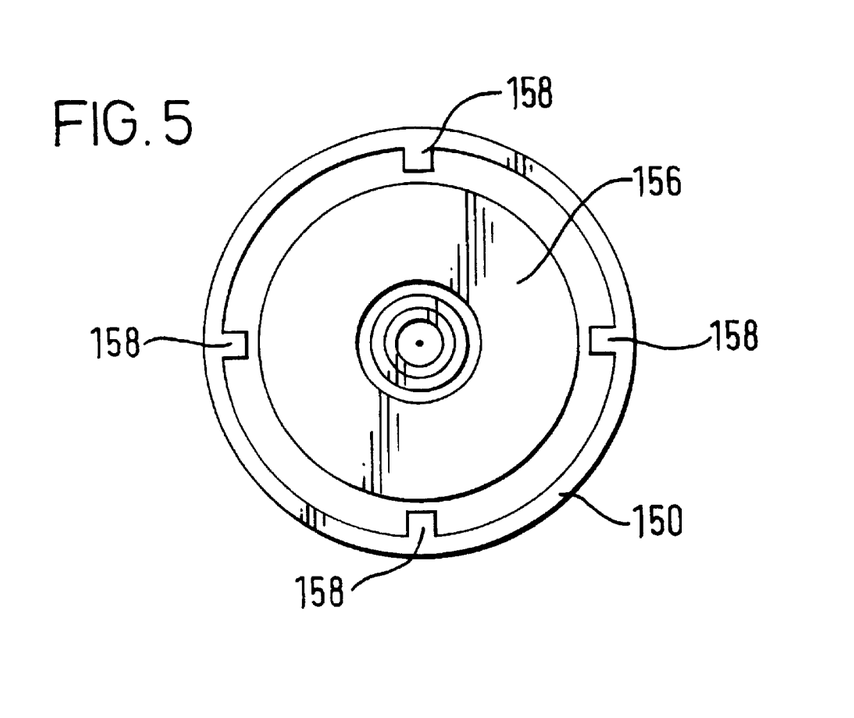
FIG. 5 is a bottom end view of the valve illustrated in FIG. 4.

Referring to FIG. 4, the interlock valve 62 (to which interlock valve 64, 66, 68 are essentially similar) is provided with a housing to which a cap 152 is attachable by means of inter-engaging screw threads. The housing 150 houses a sealing plate 154, formed of a metal such as brass, having an annular rubber seal 156 mounted on its lower surface. The sealing plate 154 is restrained within the housing by circumferentially-spaced spigots 158, whereby the valve is attached to interengaging means on the top of the storage compartment 4. With the valve 62 attached to the storage compartment 4, the sealing ring 156 seals against an opposing sealed seat. A spring 160, mounted within the housing 150 biasses the sealing plate 154 downwards. If an operator wishes to release pressure from the storage compartment 4, the valve housing 150 is manually tilted, which acts to release the seal formed between the seal 156 and the opposing seal seat.

In addition, the interlock valve 62 includes means for separately accessing the interior of the compartment, in the form of a self-sealing valve 162, such as a Twinlock (trade mark) valve. The self-sealing valve 162 includes two rubber seals 164, having a self-sealing aperture in their centre, through which a probe may be inserted to gain access to the compartment interior (as shown in FIG. 2). The self-sealing valve 162 is also provided with a removable sealing cap 166, which provides an additional means of ensuring that the self-sealing valve 162 is fluid-tight when not in use for testing. Thus, the self-sealing valve need not be tested for fluid-tightness. During testing, the cap 166 is removed and the probe is inserted through the rubber seals 164.

The self-sealing valve 162 is attached, in a fluid-tight manner, to the centre of the sealing plate 154, and is movable within the housing 150 along with the sealing plate 154, so as not to interfere with the sealing action of the interlock valve. Accordingly, the interlock valve 62 may be tested in situ whilst, at the same time, providing a means for forming an aperture (via the twin seals 164) whereby a pressurizing gas may be introduced into, or removed from, the storage compartment 4.

TEST PROCEDURE

In order to begin testing, for safety the API valves 12, 14, 16, 18 of the storage compartments are manually or pneumatically opened, and any liquid contents in the storage tanks 4, 6, 8, 10 and the outlet pipes 20, 22, 24, 26 are drained into a suitable container. The API valves are then closed, along with the foot valves 36, 38, 40, 42 and the sequential valves 44, 46, 48, 50. The first API test cap 142 is attached to the API valve 12, the first vapour recovery test cap 144 is attached to the vapour recovery valve 30, and the probes of the junction pieces 138, 140 are inserted through the self-sealing valves 162 of the interlock valves 62, 64. The test equipment is otherwise arranged as described above in relation to FIGS. 2 and 3.

Now, the first pressure return port 98, and the first pressure outlet port 126, are connected to the junction piece 138 leading to the first storage compartment 4. The second pressure return port 100 and the second pressure outlet port 128 are connected to the junction piece 140 leading to the second storage compartment 6. The third pressure return port 104 and the third pressure outlet port 130 are connected to the first API test cap 142. The fourth pressure return port 106 and the fourth pressure outlet port 132 are connected to the first vapour recovery test cap 144.

FIRST PRESSURIZATION SEQUENCE

A first pressurization sequence is performed as follows. The manual selector valve 102 is set to connect pressure return port 98 to the pressure transducer 84. The pressure transducer 84 is switched on, and set to zero against atmosphere. The selector valve 92 is set to connect input port 90 to pressure regulator 80, and selector valve 94 is set to connect pressure regulator 80 to output port 96. The pressure regulator 80 is set manually such that the dial gauge reads a pressure (for example 65 Mb) which is somewhat below the release pressure of the pressure vacuum valve 54 and in any case preferably somewhat below around 200 Mb. Next, the on/off selector valve 118 is switched to its on position, and the selector valve 134 is set to connect the pressure output port 126 to the pressure inlet port 116 of the remote valve block 72. The pressure shown on pressure transducer 84 will then increase rapidly towards the pre-set pressure and slow as the pressure is approached. When pressure transducer 84 indicates that the pre-set pressure is attained, the on/off selector valve 118 can be opened.

A short period of stabilization of the pressure within the storage compartment 4 will follow, during which time the outlet pipe 20 is depressurized as follows.

The selector switch 92 and the selector switch 94 on the control case are switched to connect to the vacuum pump 74. The vacuum regulator 78 is adjusted so that the dial gauge reads a desired vacuum (for example—165 Mb) preferably somewhat above around—200 Mb. The second pressure transducer 86 is switched on, and set to zero against atmosphere. Next, the on/off selector valve 122 is switched to the on position, to begin the depressurization of the outlet pipe 20. The vacuum shown on pressure transducer 86 begins to increase rapidly towards the pre-set level, and begins to slow as it is approached. When the pre-set level is achieved, the on/off selector valve 122 is switched to the off position.

Next, the vapour recovery manifold 28 is depressurized as follows.

The selector valve 110 is set to connect the second pressure transducer 86 to the vapour recovery test cap 144. The vacuum regulator 78 is adjusted so that the dial gauge reads a further desired vacuum (for example 20 Mb). Next, the on/off selector valve 124 is switched to the on position, and the pressure within the vapour recovery manifold rapidly tends towards the pre-set vacuum level, and slows as the vacuum is reached. The on/off selector valve 124 is then switched to the open position.

Accordingly, after this first pressurization sequence, the pressure inside the first storage compartment 4 is 65 Mb, the pressure within the outlet pipe 20 is −165 Mb, the pressure within the vapour recovery manifold 28 is −20 Mb, and the pressure within the second storage compartment 6 is equal to atmospheric pressure.

PRESSURE MONITORING

At this point, and for the duration of a monitoring period which follows the first pressurization sequence, the test operator is able to monitor the gas pressures within the first storage compartment 4, the second storage compartment 6, the outlet pipe 20 and the vapour recovery manifold 28, by viewing the displays on pressure transducers 84, 86, and by switching selector valves 102, 110.

If any of the tank shell, the baffle plate 61, the foot valve 36, the sequential valve 44, the pressure vacuum 54 or the interlock valve 62, and any other seals (such as a manhole lid seal) which may be present in or on the storage compartment 4, are leaking, the positive pressure within storage compartment 4 will begin to decrease. Otherwise the pressure within storage compartment 4 will hold.

If any of the foot valve 36, the API connection 12 or the joints of the outlet pipe 20 are leaking, the vacuum in the outlet pipe will be gradually lost. Otherwise, the vacuum within the outlet pipe 20 will hold.

If any of the vapour recovery vent adaptor 30, the connector pipe 32, the pipework forming the manifold 28, the vapour recovery vent valve 52 or the sequential valves are leaking, the vacuum within the manifold 28 will gradually be lost. Otherwise, the vacuum will hold.

If the monitored pressures vary such that it is suspected that leakage is occurring, the point(s) of leakage can be at least tentatively identified by one or more of the following methods:

1) If the pressure within the first storage compartment 4 begins to decrease and that within second storage compartment 6 correspondingly begins to increase, it can be identified that the baffle plate 61 is leaking.

2) If the pressure within the manifold 28 begins to increase and that within the second storage compartment 6 correspondingly begins to decrease, it can be identified that the sequential valve 46 is leaking.

3) Leakage of the foot valve 36 can be identified in that a pressure drop will be seen in the first storage compartment 4, and a corresponding pressure increase will be seen in the outlet pipe 20.

4) Leakage of sequential valve 44 can be identified, in that a pressure loss within storage compartment 4 will be accompanied by a corresponding pressure increase in the vapour recovery manifold 28.

5) Any leakage points which are manually accessible can be positively identified by passing a directional electronic sonic detector over an area where a leak is suspected. The location of even relatively small leaks can thus be found by the sound of gas passing through the point of leakage.

6) Where leakage is occurring between any two of the compartments being monitored, such leakage can be positively identified by determining that a monitored rate of pressure loss from one compartment, normalised with respect to its volume, is substantially equal to the rate of pressure increase, normalised with respect to its volume, in the other. A flow rate for the leakage can be readily calculated from the relative volumes of the compartments involved and the respective rates of pressure loss and pressure increase.

If pressure variations are monitored which are due solely to variations in ambient pressure or temperature, these can also be at least tentatively identified in that, although a pressure variation may occur within any of the compartments under test, accompanying pressures in the other compartments can be monitored to deduce that the pressure variations are not due to leakage. For example, a pressure drop in the first storage compartment 4 may be accompanied by a pressure drop in any or all of the outlet pipe 20, the manifolds 28 and the second storage compartment 6. Alternatively, if a pressure increase is seen in any or all of the outlet pipe 20, the manifold 28 and the second storage compartment 6, a corresponding pressure increase may be seen in the first storage compartment 4. That is to say, the pressure variations seen in the compartments which are under vacuum or at atmospheric pressure, when compared to the pressure variation seen in the compartment under positive pressure, will be different to that expected when a leak is involved.

In some cases, monitored pressure variations will be due to a number of the pressure-varying effects described. In these cases, the test operator identifies leakages by determining which components of the pressure variations are due to leakage, and where that leakage is occurring.

Following the first pressurization sequence and monitoring period, the first API test cap 142 is removed, such that the API valve 12 closes to maintain the negative pressure within the outlet pipe 20, and the second API test cap is attached to the API adaptor 12. The initial pressure monitored on the pressure transducer 86 will be atmospheric pressure, and if the API valve 12 is leaking, the pressure within the second API test cap will be seen to decrease. Otherwise, the API valve 12 is deemed to be working acceptably.

Similarly, the first vapour recovery test cap 14 is removed from the vapour recovery valve 30, thus closing the valve to maintain the negative pressure within the vapour recovery manifold 28, and the second vapour recovery test cap is attached. The pressure within the second vapour recovery test cap is then monitored by a pressure transducer 86, and if it is seen to decrease from atmospheric pressure, vapour recovery valve 30 will be identified as leaking. Otherwise, vapour recovery valve 30 can be deemed acceptable.

PRESSURE RELEASE TESTS

A sequence is next followed in order to test the efficiency of operation of the pressure vacuum valve 54, as follows.

First, selector valve 102 is switched to connect to output port 98. Selector valves 92 and 94 are switched to connect to pressure regulator 80. The positive pressure regulator 80 is set to value above the expected release pressure of the pressure vacuum valve 54, for example to 85 Mb for an expected pressure release at 70 Mb, or 135 Mb for an expected pressure release at 120 Mb. When selector valve 118 is closed, the pressure inside storage compartment 4 will gradually increase until the pressure vacuum valve 54 operates to release pressure. The pressure at which the pressure vacuum valve operates is thus accurately monitored and viewed on the display on the pressure transducer 84, allowing the test operator to certify whether the valve is operating within a predetermined margin of acceptability, for example a 10% operational margin.

If the pressure vacuum valve 54 passes the pressure release at positive pressure test, both selector valves 118 and 120 are closed, such that pressure within the first storage compartment 4 gradually decreases, and the pressure within the second storage compartment 6 gradually increases, until the pressure within these compartments is balanced (this operation ensures an economical use of the excess gas within storage compartment 4, allowing approximately half of the gas contained to be introduced into the second storage compartment, to be used in the subsequent pressurization sequence to be described below). Next, the selector valve 120 is closed, and the selector valve 134 is set to connect the first storage compartment 4 to the exhaust 136, thus releasing pressure within the storage compartment. The selector valves 92 and 94 are set to connect to vacuum pump 74, and the vacuum regulator 78 is set to a desired vacuum level below the pressure at which pressure vacuum valve 54 is expected to release at its lower pre-set levels. The selector valve 134 is then switched to connect the first storage compartment 4 to the vacuum pump 74, and the pressure will gradually decrease until the pressure vacuum valve 54 releases. The pressure of the pressure vacuum valve 54 will be accurately displayed on the pressure transducer 84, and the operator can then readily verify that the valve is operating within a predetermined acceptable margin, for example a 10% operational margin.

At this stage the first storage compartment 4 and the associated valve and the outlet pipe 20 and its valve would each have been fully tested and any leakage points will have been identified, allowing the valves in question to be replaced or other leakage points to be repaired. The first storage compartment 4 can then be pressurized, i.e. balanced to atmosphere, by switching selector valve 134 to connect the first storage compartment 4 with the exhaust pipe 136.

FURTHER PRESSURIZATION SEQUENCES

Next, a similar set of pressurizations and monitoring actions are performed in relation to the second storage compartment 6, with which the outlet pipe 22, the vapour recovery manifold 28 and the third storage compartment 8 are associated during this next stage of testing. In order to perform a testing sequence in relation to the second storage compartment 6 and its associated compartment, the junction piece connector 138 is removed from the interlock valve 62, and inserted into interlock valve 66, and the first API test cap 142 is attached to the next API valve 14. A testing sequence similar to that applied in relation to the first compartment 4 is then applied in relation to the second storage compartment 6 and its associated compartments. Unless it has been subject to leakage during the first stage, it is not generally necessary to depressurize the manifold 28 once more, since a vacuum should still be present.

Subsequently, each of the other storage compartments 8 and 10 are similarly tested.

Thus, all of the valves attached to the storage tank for fluid-tightness, and the efficacy of operation of each of the pressure vacuum valves 54, 56, 58 and 60, are fully tested by the testing sequence provided.

As can be seen from FIGS. 1 and 2, the connector pipe 32 runs through the third storage compartment 8, and any leakage of gas identified from the storage compartment 8, either when at atmospheric pressure or when at positive test pressure, into the connecting pipe 32 can be readily verified by a corresponding pressure increase in the manifold 28 at that time.

OTHER EMBODIMENTS

It is envisaged that various modifications and variations can be employed in relation to the embodiment described above, without departing from the spirit or scope of the invention which is defined in the independent claims.

For example, in place of providing a self-sealing valve on one of the operational valves of the storage compartments, in order to provide a full in situ test of all of the valves attached to the compartment, it will be possible to provide a separate aperture on the compartments, sealed by a screw-on cap, dedicated for the purpose of testing of the fluid-tightness of the compartment.

Also, the pressure values specified in the embodiment described are not limiting. However, it is preferred that a combination of positive and negative pressures, each preferably within around ±200 Mb, is applied simultaneously to adjacent compartments in order to obtain the advantages mentioned. Namely, it is possible to discount monitored pressure variations which are due to variations in the ambient temperature of barometric pressure. It is also possible to provide a pressure difference across the means separating the two compartments which is greater than the individual pressures used, which provides for enhanced leak detection and the testing of a valve, for example a foot valve, under a required pressure condition.

It has been mentioned that the invention is applicable to ISO tanks. ISO tanks generally include a single storage compartment, an outlet pipe separated from the storage compartment by a foot valve, a pressure vacuum valve, a manhole lid, and possibly a vacuum recovery conduit separated by a sequential-type valve. Thus, the ISO tank generally comprises two or three compartments and it will be appreciated that a fluid-tightness test, and a pressure-release characteristics test, similar to that described above in relation to any one of the storage compartments of the road tanker, can be employed in relation to an ISO tank.

Aspects of the invention are similarly applicable in relation to other kinds of fluid-containing systems, which may include-various different numbers and configurations of compartments.

As will be appreciated, individual features of the above described test procedure may be employed alone or in combination to advantageous effect and testing procedures employing such features alone or in combination are considered to be within the scope of the present invention.

What is claimed is:

1. A method of testing a transportable storage tank, said tank comprising a foot valve located between a liquid storage compartment and an outlet pipe, said method comprising closing said foot valve, disposing said storage compartment at a first gas pressure, which is positive in relation to atmospheric pressure, disposing said outlet pipe at a second gas pressure, which is negative in relation to atmospheric pressure, and monitoring the pressure within said storage compartment or said outlet pipe in order to determine whether said foot valve is subject to leakage;

said tank further comprising a vapor recovery conduit separated from said liquid storage compartment by a further valve, said method further comprising:

fluidly sealing said further valve;

disposing said vapor recovery conduit at a third gas pressure, different to a gas pressure in said liquid storage compartment; and monitoring pressure within said vapor recovery conduit or said liquid storage compartment in order to determine whether said further valve is subject to leakage.

2. A method according to claim 1, wherein said third gas pressure is negative in relation to atmospheric pressure.

3. A method of testing a cargo tank of a road haulage vehicle for fluid tightness, said cargo tank including a foot valve located between a liquid storage compartment and an outlet pipe having an outer end, and a second valve located at the outer end of said outlet pipe, said second valve having an outlet for dispensing fluid, said method comprising:

closing the foot valve;

connecting a first test cap to the outlet of said second valve in fluid-tight relation whereby said first test cap maintains said second valve open;

increasing pressure in the liquid storage compartment to a first gas pressure which is positive in relation to atmospheric pressure;

decreasing pressure in the outlet pipe to a second gas pressure which is negative in relation to atmospheric pressure by applying a vacuum thereto through said first test cap; and monitoring the pressure within said storage compartment or said outlet pipe in order to determine whether said foot valve is subject to leakage.

4. The method of claim 3 further including the step of draining any liquid contained in said storage compartment prior to closing the foot valve.

5. The method of claim 3 further including the steps of:

disconnecting the first test cap from said second valve after a desired time period while simultaneously closing said second valve and maintaining the negative second gas pressure in said outlet pipe;

connecting a second test cap to the outlet of said second valve in fluid-tight relation whereby the pressure between said second valve and said second test cap is at a third gas pressure which is atmospheric pressure; and monitoring the pressure between said second valve and said second test cap to determine whether said second valve is subject to leakage.

6. The method of claim 3, said tank comprising a vapor recovery conduit separated from said liquid storage compartment by a further valve, said method further comprising:

fluidly sealing said further valve;

disposing said vapor recovery conduit at a third gas pressure, different to a gas pressure in said liquid storage compartment; and monitoring pressure within said vapor recovery conduit or said liquid storage compartment in order to determine whether said further valve is subject to leakage.

7. The method of claim 6, wherein said third gas pressure is negative in relation to atmospheric pressure.

8. The method of claim 3, said tank comprising a further liquid storage compartment separated from the first-mentioned liquid storage compartment by separating means which are liable to leak, said method further comprising:

disposing said further liquid storage compartment at a gas pressure different to a gas pressure in the first-mentioned liquid storage compartment; and monitoring pressure within said further liquid storage compartment or the first-mentioned liquid storage compartment in order to determine whether said separating means is subject to leakage.

9. The method of claim 8, wherein said separating means is a wall common to said liquid storage compartments.

10. The method of claim 8, wherein said different gas pressure is substantially equal to atmospheric pressure.

* * * * *